United States Patent [19]

Ahrbeck

[11] 4,290,456
[45] Sep. 22, 1981

[54] THERMOPLASTIC PIPE STUB END

[75] Inventor: Harold Ahrbeck, Kingston, Canada

[73] Assignee: E. I. Du Pont de Nemours and Company, Wilmington, Del.

[21] Appl. No.: 815,085

[22] Filed: Jul. 13, 1977

[30] Foreign Application Priority Data

Aug. 16, 1976 [CA] Canada ................................. 259142

[51] Int. Cl.³ ............................................. F16L 47/02
[52] U.S. Cl. ................................. 138/109; 138/172; 285/286; 285/416; 285/423
[58] Field of Search ................. 138/109, 172; 285/27, 285/414, 416, 423; 156/322, 304

[56] References Cited

U.S. PATENT DOCUMENTS

| | | | |
|---|---|---|---|
| 2,412,487 | 12/1946 | Amley et al. | 285/423 X |
| 2,453,849 | 11/1948 | Merriam | 285/423 |
| 2,535,437 | 12/1950 | McCann | 138/109 |
| 2,857,175 | 10/1958 | Browning et al. | 285/416 X |
| 2,933,428 | 4/1960 | Mueller | 285/423 X |
| 3,324,894 | 6/1967 | Deal | 138/109 |
| 3,848,421 | 11/1974 | O'Brien et al. | 285/405 X |
| 3,850,459 | 11/1974 | Blumenkronz et al. | 285/423 X |
| 3,989,283 | 11/1976 | Pepper | 285/423 X |

*Primary Examiner*—James E. Bryant, III

[57] ABSTRACT

An improved thermoplastic pipe stub end for welding to thermoplastic pipe is disclosed. The stub end has a flange portion integrally joined to a neck portion which has inner and outer surfaces and terminates at a welding face. The improvement resides in the reduction of the length of neck portion such that it extends from the flange a distance in millimeters of not greater than 1.5 $\sqrt{O.D.}$, where O.D. is the outer diameter in centimeters of the neck portion at the welding face. The improved stub end permits higher strength heat welds to be made by butt fusion between the thermoplastic stub end and a thermoplastic pipe to be joined thereto.

7 Claims, 3 Drawing Figures

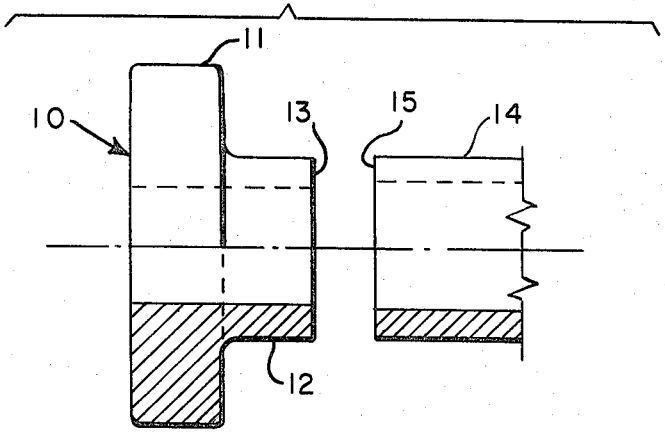
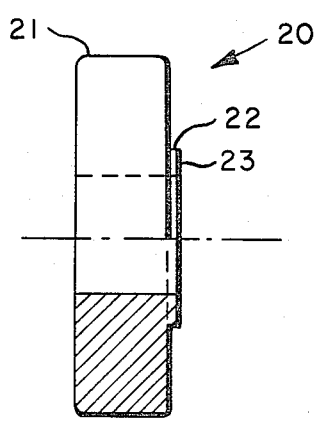
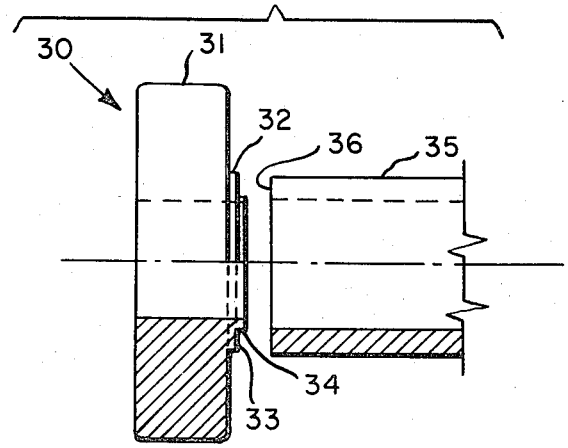

THERMOPLASTIC PIPE STUB END

FIELD AND BACKGROUND OF THE INVENTION

This invention relates to thermoplastic pipe and more particularly to an improved thermoplastic pipe stub end.

In assembling thermoplastic pipe into piping systems, successive lengths of pipe are generally either connected directly by heat welding or, where ready separation may be required, connected mechanically e.g. by bolting together metal flanges which seat against thermoplastic stub ends already heat welded to the ends of the lengths of thermoplastic pipe to be joined. A preferred method of heat welding is by butt fusion.

As used herein the term "butt fusion" means a method of heat welding comprising the steps of (1) aligning the thermoplastic parts to be joined; (2) bringing the mating surfaces of the thermoplatic parts to be joined into engagement with the opposite sides of a flate heater plate which is maintained at a predetermined termperature to plastify the surfces; (3) separating the plastified surfaces from the heater plate; (4) removing the heater plate; and (5) bringing the plastified surfaces together under a predetermined pressure.

In practice, where butt fusion is performed correctly, the direct or pipe-to-pipe heat welds are normally as strong as the pipe itself i.e. in tests as hereinafter described failure rarely occurs at the heat weld. However, where the same butt fusion technique is used to join standard thermoplastic pipe stub ends to thermoplastic pipe, the heat welds are frequently the point of iniation of failure when piping systems including such stub ends and pipe are tested to destruction in tests as hereinafter described.

The standard thermoplastic pipe stub end, as further described and illustrated hereinafter, consists of a flange and a neck portion, which is adapted to be heat welded to a thermoplastic pipe. The length of the neck portion is approximately equal to the width of the flange and the outer circumference of the neck portion joins the flange in a smooth arc.

In order to facilitate the formation of stub end-to-pipe welds which are more nearly equivalent to pipe-to-pipe welds, the trend in the art has been towards the use of thermoplastic pipe stub ends having longer neck portions. Thermoplastic pipe stub ends having longer neck portions with a continuous taper from the flange to the welding face (i.e. the neck wall is very thick at the flange but reduces to near pipe diameter at the welding face) have also been used. However, thermoplastic pipe stub ends having such longer neck portions are expensive to produce and to maintain an inventory thereof.

THE INVENTION

Surprisingly it has now been found that if the neck portion of a thermoplastic pipe stub end is substantially eliminated i.e. reduced to a raised welding face, a thermoplastic pipe stub end results which may be produced economically and which may be joined to a thermoplastic pipe by butt fusion to provide a stub end-to-pipe heat weld which will generally outlast the pipe itself when a stub end-pipe combination is tested to destruction.

Accordingly, the present invention provides an improved thermoplastic pipe stub end having a flange portion integrally joined to a neck portion, the neck portion having inner and outer surfaces and terminating at a welding face, the improvement comprising the neck portion extending from the flange a length in millimeters of not greater than $1.5\sqrt{O.D.}$, where O.D. is the outer diameter in centimeters of the neck portion at the welding face.

In one embodiment of the thermoplastic stub end of the present invention, the neck portion extends from the flange a length in millimeters in the range of from $0.3\sqrt{O.D.}$ to $1.2\sqrt{O.D.}$.

In another embodiment an annular locating lip projects from the welding face at the inner surface of the neck portion, the locating lip being adapted to fit in the end of a thermoplastic pipe to aid in the coaxial alignment of the stub end and the pipe prior to heat welding the stub end to the pipe.

The thermoplastic pipe stub end of the present invention may be made from any thermoplastic material which may be satisfactorily heat welded by butt fusion. Preferred thermoplastic materials are homo or copolymers of olefins, such as, for example, polybutylenes, polypropylenes and polyethylenes. An especially preferred thermoplastic material is a polyethylene having a density in the range of from 0.938 to 0.944 g/cm$^3$ and a melt index as measured by the method of ASTM 1238 in the range of from 0.15 to 0.40 dg/min.

The invention may be illustrated by reference to the accompanying drawings in which:

FIG. 1 is a schematic view partly in section of a thermoplastic pipe stub end according to the prior art;

FIG. 2 is a schematic view partly in section of one embodiment of a thermoplastic pipe stub end according to the present invention; and FIG. 3 is a schematic view partly in section of another embodiment of a thermoplastic pipe stub end according to the present invention.

In FIG. 1, a thermoplastic pipe stub end according to the prior art is designated generally by the numeral 10. The stub end 10 has a flange portion 11 and a neck portion 12 which is integrally joined to the flange. The neck portion 12 has a welding face 13 which is adapted to be heat welded to a face 15 of a pipe 14 by butt fusion. In heat welding by butt fusion: (1) the stub end 10 and the pipe 14 are axially aligned; (2) the welding face 13 and the pipe face 15 are brought into engagement with the opposite sides of a flate heater plate (not shown) which is maintained at a predetermined temperature; (3) the heater plate is then removed; and (4) the plastified surfaces of welding face 13 and pipe face 15 are brought together under pressure to complete the heat welding thereof.

In FIG. 2 a thermoplastic pipe stub end according to one embodiment of the present invention is designated generally by the numeral 20. The stub end 20 has a flange portion 21 and a neck portion 22, the neck portion 22 being only as long as required to provide welding clearance for heat welding face 23 thereof to the face of a pipe (not shown) to be joined thereto by butt fusion in the same manner as described above in the description of FIG. 1. The neck portion 22 should have a length such that the heater plate used in the heat welding does not contact the flange portion 21. However, the length of the neck portion 22 should not be so great that an appreciable neck remains after the heat welding by butt fusion. A suitable length for neck portion 22 has been found to vary with the outer diameter (O.D.) of the neck portion 22 at the welding face 23 (which is the same as the O.D. of pipe to be joined thereto) approximately in proportion to the square root thereof. The length of neck portion 22 in millimeters should not be greater than $1.5\sqrt{O.D.}$, where O.D. is the outer diameter in centimeters of the neck portion 22 at the welding face 23. In a preferred embodiment of the present invention neck portion 22 has a length in millimeters in the range of from $0.3\sqrt{O.D.}$ to $1.2\sqrt{O.D.}$. In a more preferred embodiment the length of neck portion 22 in millimeters is in the range of $0.5\sqrt{O.D.}$ to $1.0\sqrt{O.D.}$.

In FIG. 3 a thermoplastic pipe stub end according to another embodiment of the present invention is designated generally by the numeral 30. The stub end 30 has a flange 31 and a neck portion 32 of a similar length to the neck portion 22 of FIG. 2. The neck portion 32 has a welding face 33 which is adapted to be heat welded to the face 36 of a pipe 35 by butt fusion. An annular locating lip 34 projects from the welding face 33 at the inner surface of the neck portion 32. The locating lip 34 is adapted to fit into the end of the pipe 35 to aid in the coaxial alignment of the stub end 30 and the pipe 35 prior to heat welding as described above in the description of FIG. 1. Such coaxial alignment of the stub and the pipe is important, because it has been observed that if the inner wall of the pipe projects within the circle formed by the inner wall of the stub end during heat welding, premature failure of the stub end-to-pipe weld may result.

The present invention is illustrated by the following examples:

The series number of the pipes used in the examples are related to the design properties of the pipes. The numbers are American National Standards Institute (ANSI) Z 17.1-1958, R-10 series, numbers.

EXAMPLE I

Over a period of several months, a large number of nominal six inch diameter (actually 16.8 cm O.D.) series 60 standard (i.e. prior art as illustrated in FIG. 1) thermoplastic pipe stub ends were heat welded to nominal six inch diameter (actually 16.8 cm O.D.) series 60 thermoplastic pipe by butt fusion as hereinbefore described. Both the stub ends and the pipe were made from polyethylene having a density in the range of from 0.938 to 0.944 g/cm$^3$ and a melt index as measured by the method of ASTM D-1238 in the range of from 0.15 to 0.40 dg/min. The dimensions of the stub ends and the pipe were as follows:

| Stub end: | Flange thickness | = | 1.06 inches (2.69 cm) |
| --- | --- | --- | --- |
| | Neck length | = | 0.94 inches (2.39 cm) |
| | Neck thickness at welding face | = | 0.40 inches (1.02 cm) |
| Pipe: | Wall thickness | = | 0.304 inches (7.72 mm) |

The stub end-pipe combinations were subjected at a temperature of 80° C. to a pressure (measured in hoop stress in psi) of 598 psi (4.1 MPa) and the time to rupture of the pipe or to rupture of the stub end-to-pipe weld was measured.

The results are given in Table I.

TABLE 1

| Sample No. | Type of Failure | Time to Failure (Hours) | |
| --- | --- | --- | --- |
| | | Pipe | Weld |
| 1 | Weld | | 43 |
| 2 | Weld | | 63 |
| 3 | Weld | | 97 |

TABLE 1-continued

| Sample No. | Type of Failure | Time to Failure (Hours) | |
| --- | --- | --- | --- |
| | | Pipe | Weld |
| 4 | Weld | | 104 |
| 5 | Weld | | 96 |
| 6 | Pipe | 138 | |
| 7 | Weld | | 95 |
| 8 | Weld | | 65 |
| 9 | Weld | | 164 |
| 10 | Weld | | 155 |
| 11 | Weld | | 90 |
| 12 | Weld | | 116 |
| 13 | Weld | | 199 |
| 14 | Pipe | 169 | |
| 15 | Pipe | 181 | |
| 16 | Weld | | 123 |
| 17 | Weld | | 66 |
| 18 | Weld | | 68 |
| 19 | Weld | | 79 |
| 20 | Weld | | 119 |
| 21 | Weld | | 74 |
| 22 | Weld | | 96 |
| 23 | Weld | | 54 |
| 24 | Weld | | 63 |
| Average | | 163 | 97 |

In the above tests to failure (at the test conditions of 80° C. and 598 psi (4.1 MPa) hoop stress), the stub end-pipe combinations failed at the stub end-to-pipe weld in 87.5% of the samples.

EXAMPLE II

Over a period of several months, a number of nominal six inch diameter (actually 16.8 cm O.D.) series 60 thermoplastic pipe stub ends according to one embodiment of the present invention (i.e. as illustrated in FIG. 2) were heat welded to nominal six inch diameter (actually 16.8 cm O.D.) series 60 thermoplastic pipe by butt fusion as hereinbefore described. Both the stub ends and the pipe were made from polyethylene having a density in the range of from 0.938 to 0.944 g/cm$^3$ and a melt index in the range of from 0.15 to 0.40 dg/min. The dimensions of the stub ends and the pipe were as follows:

| Stub end: | Flange thickness, all samples | = | 1.06 inches (2.69 cm) |
| --- | --- | --- | --- |
| | Neck length: | | |
| | sample 1 | = | 0.035 inches (0.9 mm) |
| | sample 2 to 5 | = | 0.075 inches (1.9 mm) |
| | sample 6 & 7 | = | 0.125 inches (3.2 mm) |
| | Neck thickness at welding face, all samples | = | 0.40 inches (1.02 cm) |
| Pipe: | Wall thickness | = | 0.304 inches (7.72 mm) |

The stub end-pipe combinations were subjected at a temperature of 80° C. to a pressure (measured in hoop stress in psi) of 598 psi (4.1 MPa) and the time to rupture of the pipe or to rupture of the stub end-to-pipe weld was measured.

The results are given in Table 2.

TABLE 2

| Sample No. | Type of Failure | Time to Failure (Hours) | |
| --- | --- | --- | --- |
| | | Pipe | Weld |
| 1 | Weld | | 146 |
| 2 | Pipe | 243 | |
| 3 | Pipe | 125 | |
| 4 | Pipe | 143 | |

TABLE 2-continued

| Sample No. | Type of Failure | Time to Failure (Hours) | |
|---|---|---|---|
| | | Pipe | Weld |
| 5 | Pipe | 117 | |
| 6 | Pipe | 183* | |
| 7 | Pipe | 183* | |
| Average | | 166 | 146 |

*In these samples, a stub end was heat welded to each end of the same piece of pipe.

In the above tests to failure, only the stub end-pipe combination of sample 1 failed at the stub end-to-pipe weld. Sample 1 failed after 146 hours, longer than the average time to failure of 97 hours for the 21 samples of standard stub end-pipe combinations which failed at the stub end-to-pipe welds in Example 1.

The stub end-to-pipe heat welds in samples 2 to 7 inclusive (at the test conditions of 80° C. and 598 psi (4.1 MPa) hoop stress) were stronger than the pipe itself and survived an average of 166 hours without failure.

EXAMPLE III

Over a period of several months, a number of nominal 6 inch diameter (actually 16.8 cm O.D.) series 60 thermoplastic pipe stub ends according to another embodiment of the present invention (i.e. as illustrated in FIG. 3) were heat welded to nominal 6 inch diameter (actually 16.8 cm O.D.) series 60 thermoplastic pipe by butt fusion as hereinbefore described. Both the stub ends and pipe were made from polyethylene having a density in the range of from 0.938 to 0.944 g/cm³ and a melt index in the range of from 0.15 to 0.40 dg/min. The dimensions of the stub ends and pipe were as follows:

| Stub end: | Flange thickness, all samples | = 0.50 inches (1.3 cm) |
|---|---|---|
| | Neck length, all samples | = 0.050 inches (1.3 mm) |
| | Neck thickness at welding face | = 0.40 inches (1.02 cm) |
| | Width of locating lip, all samples | = 0.030 inches (0.76 mm) |
| | Length of locating lip, all samples | = 0.075 inches (1.9 mm) |
| Pipe: | Wall thickness, all samples | = 0.304 inches (7.72 mm) |

The stub end-pipe combinations were subjected at a temperature of 80° C. to a pressure (measured in hoop stress in psi) of 598 psi (4.1 MPa) and the time to rupture of the pipe or to rupture of the stub end-to-pipe weld was measured.

The results are given in Table 3.

TABLE 3

| Sample No. | Type of Failure | Time to Failure (Hours) | |
|---|---|---|---|
| | | Pipe | Weld |
| 1 | Pipe | 144 | |
| 2 | Pipe | 191 | |
| 3 | Pipe | 188 | |
| 4 | Pipe | 144 | |
| 5 | Pipe | 230* | |
| 6 | Pipe | 230* | |
| Average | | 188 | |

*In these samples, a stub end was welded to the opposite ends of the same piece of pipe.

The stub end-to-pipe heat welds in all of the above samples (at the test conditions of 80° C. and 598 psi (4.1 MPa) hoop stress) were stronger than the pipe itself and survived an average of 188 hours without failure.

EXAMPLE IV

Two nominal 8 inch diameter (actually 21.9 cm O.D.) series 100 thermoplastic pipe stub ends according to the embodiment of the present invention illustrated in FIG. 3 were heat welded to nominal 8 inch diameter (actually 21.9 cm O.D.) series 100 thermoplastic pipe by butt fusion as hereinbefore described. Both the stub ends and the pipe were made from polyethylene having a density in the range of from 0.938 to 0.944 g/cm³ and a melt index in the range of from 0.15 to 0.40 dg/min. The dimensions of the stub ends and pipe were as follows:

| Stub end: | Flange thickness | = 0.775 inches (1.97 cm) |
|---|---|---|
| | Neck length | = 0.050 inches (1.3 mm) |
| | Neck thickness at welding face | = 0.72 inches (1.83 cm) |
| | Width of locating lip | = 0.035 inches (0.89 mm) |
| | Length of locating lip | = 0.050 inches (1.3 mm) |
| Pipe: | Wall thickness | = 0.57 inches (1.45 cm) |

The stub end-pipe combinations were subjected at a temperature of 80° C. to a pressure (measured in hoop stress in psi) of 598 psi (4.1 MPa) and the time to rupture of the pipe or to rupture of the stub end-to-pipe weld was measured.

The results are given in Table 4.

TABLE 4

| Sample No. | Type of Failure | Time to Failure (Hours) | |
|---|---|---|---|
| | | Pipe | Weld |
| 1 | Pipe | 148 | |
| 2 | Pipe | 195 | |
| Average | | 172 | |

The stud end-to-pipe welds in the above samples (at the test conditions of 80° C. and 598 psi (4.1 MPa) hoop stress) were stronger than the pipe itself and survived an average of 172 hours without failure.

EXAMPLE V

A nominal 6 inch diameter (actually 16.8 cm O.D.) series 60 standard (i.e. prior art at illustrated in FIG. 1) thermoplastic pipe stub end and a nominal 6 inch diameter (actually 16.8 cm O.D.) series 60 thermoplastic pipe stub end according to the embodiment of the present invention illustrated in FIG. 3 were heat welded to the opposite ends of a nominal 6 inch diameter (actually 16.8 cm O.D.) series 60 thermoplastic pipe by butt fusion as hereinbefore described. Both the stub ends and the pipe were made from polyethylene having a density in the range of from 0.938 to 0.944 g/cm³ and a melt index in the range of from 0.15 to 0.40 dg/min. The dimensions of the stub ends and the pipe were as follows:

| Stub Ends: | | | |
|---|---|---|---|
| (1) Standard: (Prior Art) | flange thickness | = 1.06 inches (2.69 cm) | |
| | neck length | = 0.94 inches (2.39 cm) | |
| | neck thickness at welding face | = 0.40 inches (1.02 cm) | |
| (2) Present Invention: (See FIG. 3) | flange thickness | = 0.50 inches (1.3 cm) | |
| | neck length | = 0.050 inches (1.3 mm) | |
| | neck thickness at | | |

-continued

Stub Ends:
| | | |
|---|---|---|
| welding face | = | 0.40 inches(1.02 cm |
| width of locating lip | = | 0.030 inches(0.76 mm) |
| length of locating lip | = | 0.050 inches(1.3 mm) |

Pipe (1) Wall thickness=0.304 inches (7.72 mm)

The stub end-pipe combinations were subjected at a temperature of 23° C. to a pressure (measured in hoop stress in psi) of 1775 psi (12.2 MPa) and the time to rupture of pipe or rupture of either of the stub end-to-pipe welds was measured.

The pipe ruptured in ductile failure after 58 hours.

The stub end-to-pipe welds for both the prior art stub end and the stub end of the present invention (at the test conditions of 23° C. and 1775 psi (12.2 MPa) hoop stress) were stronger than the pipe itself.

EXAMPLE VI

A nominal 6 inch diameter (actually 16.8 cm O.D.) series 60 standard (i.e. prior art as illustrated in FIG. 3) thermoplastic pipe stub end and a nominal 6 inch diameter (actually 16.8 cm O.D.) series 60 thermoplastic stub end according to the embodiment of the present invention shown in FIG. 3 were heat welded to the opposite ends of a nominal 6 inch diameter (actually 16.8 cm O.D.) series 60 thermoplastic pipe by butt fusion as hereinbefore described. The compositions and dimensions of the stub ends and pipe were the same as compositions and dimension of the stub ends and pipe described in Example V.

The stub ends-pipe combination was subjected at a temperature of 23° C. to a pressure (measured in hoop stress in psi) of 1500 psi (10.3 MPa).

After a period of 2250 hours under the above test conditions the pipe and both stub end-to-pipe welds were still intact (i.e. no rupture had occurred).

The embodiment of the invention in which an exclusive property or privilege is claimed are defined as follows:

1. An improved thermoplastic pipe stub end having a flange portion integrally joined to a neck portion, the neck portion having inner and outer surfaces and terminating at a welding face, the improvement comprising the neck portion extending from the flange a length in millimeters of not greater than $1.5\sqrt{O.D.}$, where O.D. is the outer diameter in centimeters of the neck portion at the welding face.

2. The thermoplastic pipe stub end according to claim 1 wherein the neck portion extends from the flange a length in millimeters in the range of from $0.3\sqrt{O.D.}$ to $1.2\sqrt{O.D.}$.

3. The thermoplastic pipe stub end according to claim 1, wherein the neck portion extends from the flange a length in millimeters in the range of from $0.5\sqrt{O.D.}$ to $1.0\sqrt{O.D.}$.

4. The thermoplastic pipe stub end according to claim 3, wherein an annular locating lip projects from the welding face at the inner surface of the neck portion, the locating lip being adapted to fit in an end of a thermoplastic pipe to aid in the coaxial alignment of the stub end and the pipe prior to heat welding the stub end to the pipe.

5. The thermoplastic pipe stub end according to any one of claim 1, wherein the stub end is made from a polyolefin.

6. The thermoplastic pipe stub end according to any one of claim 1, wherein the stub end is made from a polyethylene.

7. The thermoplastic pipe stub end according to any one of claim 1, wherein the stub end is made from a polyethylene having a density in the range of from 0.938 to 0.944 g/cm$^3$ and a melt index in the range of 0.15 to 0.4 dg/min.

* * * * *